Jan. 5, 1932.     F. H. WHITMAN     1,839,627
PRECISION GRINDER
Filed Aug. 26, 1929     3 Sheets-Sheet 1
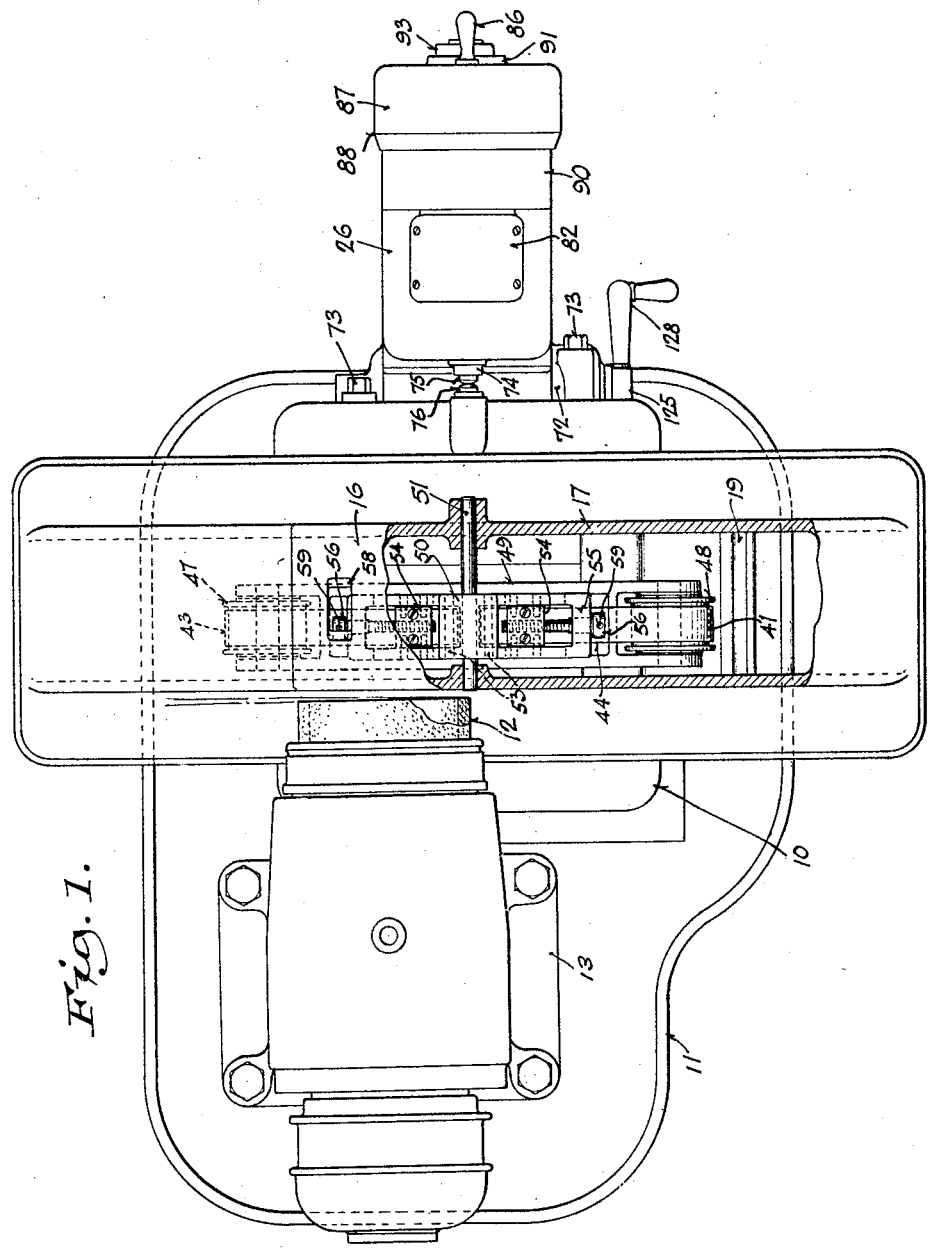
INVENTOR.
FRED H. WHITMAN
BY
ATTORNEY.

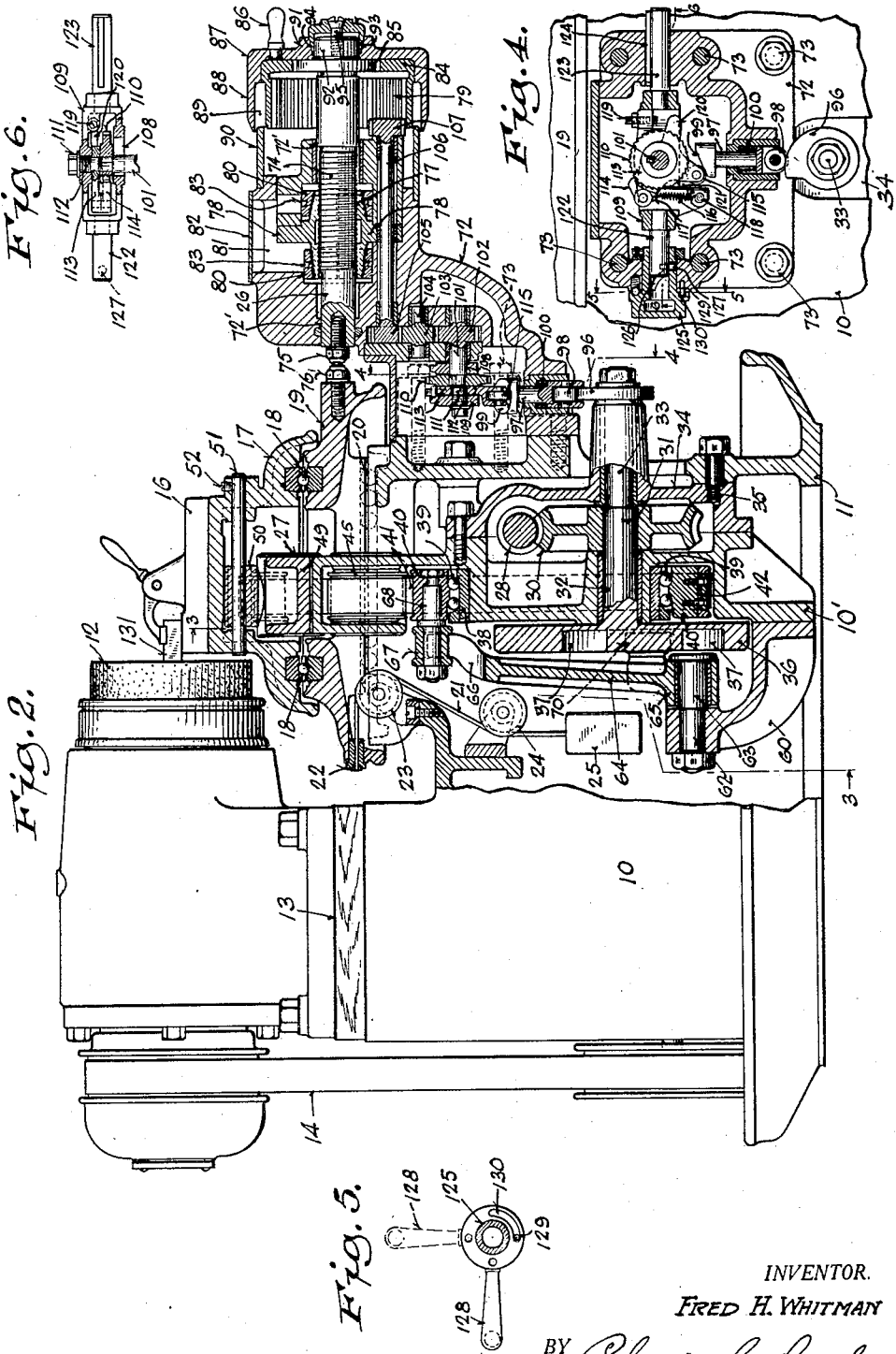

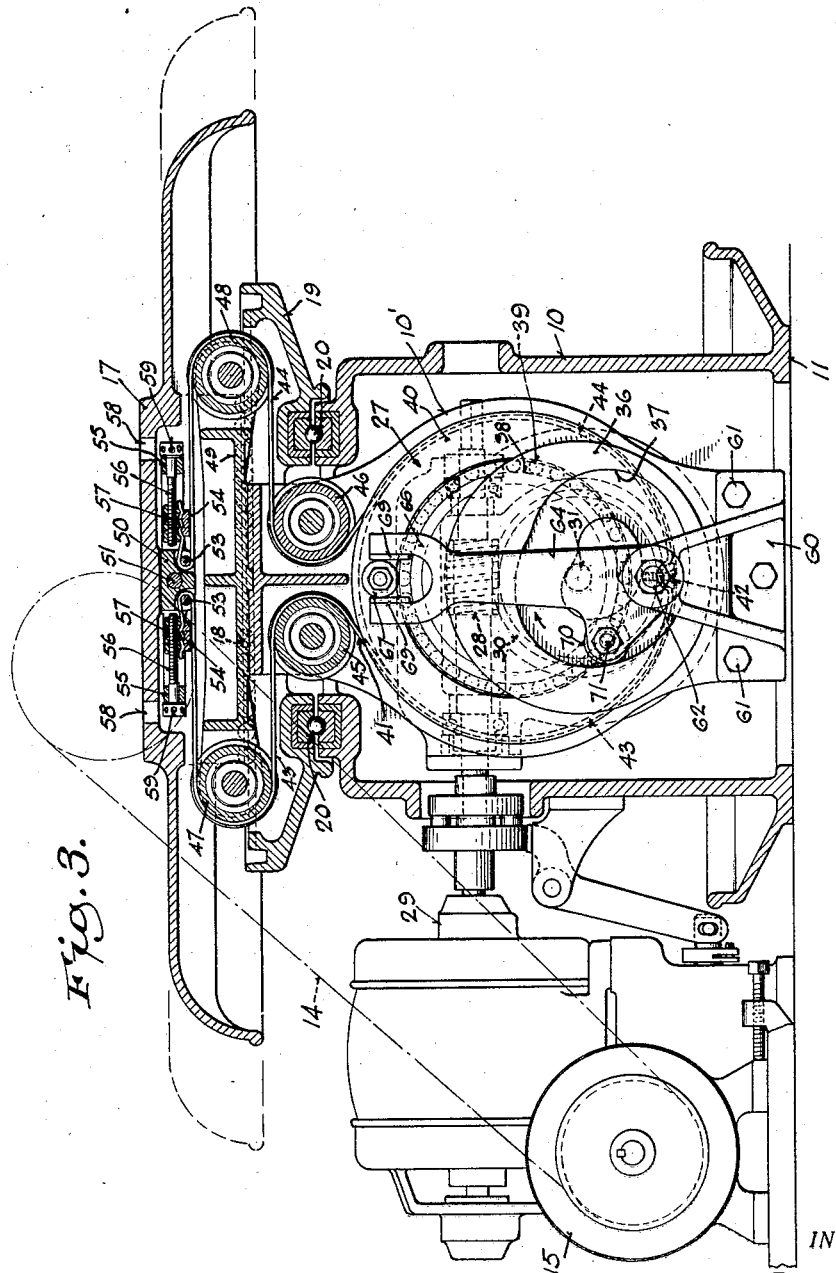

Patented Jan. 5, 1932

1,839,627

UNITED STATES PATENT OFFICE

FRED H. WHITMAN, OF MILWAUKEE, WISCONSIN, ASSIGNOR TO A. O. SMITH CORPORATION, OF MILWAUKEE, WISCONSIN, A CORPORATION OF NEW YORK

PRECISION GRINDER

Application filed August 26, 1929. Serial No. 388,364.

The invention resides in the provision of a precision grinder including a grinding element, a work carrying table set up to be moved toward and away from the grinding element and to be reciprocated transversely thereof, whereby the depth of a cut to be made upon work supported by said table can be regulated and the cut can be accomplished, and improved mechanism for driving or manipulating the said table constructed and arranged so as to preclude the transmission of vibrations to the work through the said driving or manipulating mechanism.

The general nature of the invention having thus been briefly stated, the features and characteristics thereof will now be more fully described and pointed out in the claims hereto appended.

In the accompanying drawings forming a part of this specification:

Figure 1 is a top plan view, partially broken away and partially in section, of a machine in which the features of the invention are incorporated;

Fig. 2 is a vertical longitudinal sectional view thereof, disclosing the grinding element in elevation;

Fig. 3 is a vertical transverse sectional view, as on line 3—3 in Fig. 2;

Fig. 4 is a detail sectional view, as on line 4—4 in Fig. 2; and

Figs. 5 and 6 are further detail sectional views, as on lines 5—5 and 6—6, respectively, in Fig. 4.

With respect to the drawings and the numerals of reference thereon, the frame of the novel machine, denoted generally at 10, is supported upon a base, represented 11.

A grinding wheel 12 of ordinary construction is suitably located upon the frame 10, as at 13, and is rotated in any convenient manner, as by a belt 14 receiving its power from a motor 15 situated adjacent the machine frame.

A work carrying table 16 is set up to be moved toward and away from the grinding element in order that the depth of a cut to be made upon work supported upon the table can be regulated, and the said table 16 is adapted to be reciprocated transversely of the grinding element in order that the cut can be accomplished.

As disclosed, the work carrying table is situated upon a transversely movable carriage 17 mounted and guided, as by ball bearings 18, upon a longitudinally movable carriage 19; itself mounted and guided, as by ball bearings 20, upon the machine frame.

A strap 21, secured to the movable carriage 19 as at 22 and ridable over idler pulleys 23 and 24 suitably mounted upon the frame, carries a weight 25 which urges the said carriage 19, and hence the work carrying table 16, in direction away from the grinding wheel. See Fig. 2. Mechanism to be hereinafter fully described, designated generally at 26 in Figs. 1 and 2, is for the purpose of advancing the longitudinally movable carriage and the work carrying table toward the grinding wheel against the action of the weight 25.

Mechanism denoted generally at 27 is for the purpose of reciprocating the movable carriage 17, and hence the work carrying table thereon, transversely of the grinding wheel. Of this last mentioned mechanism, numeral 28 represents a worm, driven by a motor 29, which meshes with a worm wheel 30 fixed upon a horizontal shaft 31 having its forward end portion 32 mounted in a member 10' inserted in the frame and its rearward end portion 33 mounted in a shaped plate 34 secured upon the frame as at 35. The member 10' is suitably supported from the shaped plate. See Fig. 2. The shaped plate 34 cooperates with the member 10' on the machine frame to provide a housing for the worm 28 and worm wheel 30, and the forward end portion 32 of the horizontal shaft 31 fixedly carries a cam wheel 36 situated in front of the housing and having a circumferential cam slot 37 in its forward face. See Figs. 2 and 3.

A ball race 38 about a portion of the member 10' housing the worm and worm wheel has bearing balls 39 upon which a drum 40 is mounted to have oscillatory movement. A cable (or cables) 41 about the drum, and secured to the lower portion thereof, as indicated at 42, includes the two branches, designated 43 and 44, respectively, which pass upwardly between and over spaced idler rolls 45 and 46 suitably mounted upon the member 10' of the frame and above the drum 40, in not far distant relation to each other. The two branches 43 and 44 extend in opposite directions from the upper portions of the idler rolls 45 and 46. Thence they pass upwardly over and about other idler rolls 47 and 48, which are suitably mounted just above the idler rolls 45 and 46, in a bracket 49 upon the member 10' of the frame, between the carriages 17 and 19, and are spaced a considerably further distance apart than are the idler rolls 45 and 46. Thence the branches of the cable extend toward each other, and are adjustably fastened, in the manner best disclosed in Figs. 2 and 3, to the carriage 17.

The numeral 50 represents a cage slidably receiving a rod 51 removably fixed in the side walls of the carriage 17, as by a set screw 52. The adjacent end portions of the cable branches pass between and upwardly over shanks 53 of the cage, first toward and then away from each other, and the ends of said branches are secured in clamps 54 of ordinary or preferred construction. The cage includes end walls 55 each of which rotatably supports an adjusting screw 56, the said adjusting screws in the different end walls extending toward each other and having their heads situated in engagement with the end walls. Each adjusting screw has its threaded portion arranged in an internal thread 57 of a clamp 54. Openings 58 in the carriage 17 are for the purpose of allowing entry of a suitable tool to holes 59 in the head of each adjusting screw 56, whereby the adjusting screw can be turned in the end wall of the cage 50 to move the clamp along the threaded portion of the adjusting screw, to thus adjust the tension of the corresponding branch of the cable 41 in a manner which is obvious.

A bracket 60 secured to the lower portion of the member 10', as at 61, and extending upwardly and outwardly therefrom, provides a bearing 62 for a short shaft 63 extending inwardly from the bearing toward the cam wheel 36. An upstanding arm 64, having its lower extremity 65 mounted upon the inwardly extending portion of the short shaft 63, has an upper bifurcated portion 66 between the legs of which a roller 67, secured as at 68 to the upper portion of the adjacent face of the drum 40, is situated. The legs of the bifurcated portion 66 are spaced apart a distance approximately equal to the diameter of the roller 67, and parallel plates 69 of said legs, which extend longitudinally of the arm 64, are adapted to slidably engage opposite surfaces of the said roller. Numeral 70 represents a cam roller secured to the inner face of the arm 64, as at 71, and ridable in the circumferential cam slot 37 of the cam wheel 36.

Of the mechanism 26 for advancing the longitudinally movable carriage and the work carrying table toward the grinding wheel against the action of the weight 25, numeral 72 designates a bracket secured upon the machine frame as at 73, and suitably supporting and guiding, as at 72', a horizontal lead screw 74 having an insert or tip 75 in its inner end and directly engaging a similar insert or tip 76 situated in the carriage 19 in opposed relation to the support on said carriage for the weight 25. The lead screw 74 is turnable in an internal thread 77 of a member 78 suitably fixed in the bracket 72, and the outer portion of the said lead screw is conveniently fixed to an internal gear 79 about and in spaced relation to an outer portion of the lead screw. More specifically, the member 78 may be a split ring conveniently fixed against turning movement in the bracket 72 and held to the lead screw 74 by clamp rings 80 about opposite threaded tapering end portions of the split ring and manipulable by a suitable tool insertable, through an opening 81 in the bracket and having a removable cover 82, into holes 83 in the perimeter of each clamp ring. The internal gear 79 has a hub 84 which is situated at one side of the internal gear and about and in spaced relation to an enlargement 85 upon an outer portion of the lead screw 74, and the said hub is conveniently attached, as by a manipulating handle 86 thereon, to a cover 87 for the internal gear and through which the manipulating handle passes.

The cover 87 includes an annular skirt 88 directly about and in spaced relation to the internal gear, providing an annular space 89 between the internal gear and skirt adapted to receive an annular cover 90 upon the bracket 72 and about the lead screw 74. The said cover 87 also includes a disc portion 91 arranged contiguous with the hub 84 of the internal gear and the enlargement 85 of the lead screw 74, and about the perimeter of the outer end portion 92 of said lead screw 74, in slightly spaced relation thereto. A clamping cap 93 fastens the cover 87 in fixed relation to the lead screw 74. As disclosed, the clamping cap 93 has an annular flange 94 which is held in wedging relation between the perimeter of the outer end portion 92 of the lead screw 74 and the wall of the opening of the disc portion 91 of the cover 87, about the end portion 92, by means of a clamping screw 95 passing through the body of the clamping cap and entering the end of the lead screw.

A cam 96 fixed upon the rearward end portion 33 of the shaft 31 is adapted to intermittently rotate the internal gear 79, to advance the lead screw, and hence advance the carriage 19 with the work carrying table 16, toward the grinding wheel, through the instrumentality of devices constructed and arranged as follows:

A push rod 97 which is slidably guided in a portion of the bracket 72 has a roller 98 upon its lower end adapted to be engaged and elevated by the cam 96, and the said push rod has an oblique or cam face 99 upon its upper end. A coil spring 100 about the push rod, and bearing at its upper end against the bracket 72 and at its lower end against a part of the push rod, urges the roller 98 of the push rod against the cam 96.

A short shaft 101 suitably mounted in the bracket 72 fixedly carries a small gear 102 which meshes with an idler gear 103 upon a shorter shaft 104 also suitably mounted in the bracket 72. The idler gear 103 in turn meshes with a small gear 105 fixed upon a longer shaft 106 suitably mounted in said bracket 72. At its end opposite the small gear 105, the shaft 106 fixedly carries a small gear 107 which meshes with the internal gear 79. As will be apparent from Fig. 2, the small gear 107 has width considerably less than the width of the internal gear.

The forward end portion of the short shaft 101 passes through an elongated slot 108 in a cage 109 slidable in the bracket 72, and fixedly carries a ratchet 110 situated within the cage 109.

A short shaft 111 mounted as at 112 in the side wall of the cage 109 which is opposite the elongated slot 108, rotatably supports an actuating lever 113 for the ratchet 110. The short shaft 111, or axis of the actuating lever 113, is normally in alignment with the short shaft 101, or axis of the ratchet 110. As disclosed, the actuating lever 113 includes an arm having a pawl 114 adapted to engage the teeth of the ratchet 110, and an arm having a roller 115 adapted to be engaged by the oblique or cam face 99 of the push rod 97. A small coil spring 116 attached to the arm of the actuating lever having the pawl, as at 117, and to the cage, as at 118, yieldingly urges the actuating lever in direction toward a stop 119, adjustably situated upon the cage 109 to be engaged by an arm 120 of said actuating lever, to predetermine the initial position of the pawl 114. A flat spring 121 upon the cage 109 and engaging the teeth of the ratchet is for the well-known purpose of checking backward turning of the ratchet. See Figs. 2 and 4.

It has been stated that the cage 109 is slidable in the bracket 72. As disclosed more clearly in Figs. 4, 5, and 6, the cage 109 includes studs 122 and 123 slidably situated in the bracket 72, the stud 123 being keyed to the bracket as at 124 to preclude turning movement of the cage, as will be understood. The stud 122 of the cage 109 is mounted in a sleeve 125 suitably situated against longitudinal movement in the bracket to be rotatable therein. The said sleeve is provided with a cam slot 126 in which a pin 127 upon the stud 122 is located, and is also provided with a manipulating handle 128 by utilization of which the sleeve can be given a part turn. A pin 129 in the bracket 72 and ridable in a depression 130 in the sleeve, limits the extent to which the sleeve can be turned in the bracket. See Figs. 4 and 5.

Clearly, by rotating the sleeve 125 in proper direction, the pin 127 can be caused to ride to the outer end of the cam slot 126, to move the cage 109 toward the left in Figs. 4 and 6, and thus move the roller 115 to one side of the oblique or cam face 99, out of engagement with said oblique or cam face, and the pawl 114 and the flat spring 121 out of engagement with the teeth of the ratchet 110. With the parts so positioned, the work carrying table 16 can obviously be situated to present the work 131 thereon at any desired initial relation to the grinding wheel 12, as, for example, by manipulating the handle 86 to turn the internal gear 79, and with it, the lead screw 74.

Upon turning the sleeve 125 in opposite direction to cause the pin 127 to move to the end of the slot at the right, as it is shown in Fig. 4, and thus cause the axes of the ratchet 110 and the actuating lever 113 to align, the pawl 114 and the flat spring 121 are brought into operative relation to the ratchet, and the roller 115 upon the actuating lever is brought into operative engagement with the oblique or cam face 99 of the push rod 97. When now the worm 28 is driven to rotate the cam wheel 36, the cam 96, fixed on the same shaft as the said cam wheel 36, obviously makes a complete revolution synchronously with the cam wheel.

As will be evident, each revolution of the cam wheel 36 causes a complete back and forth oscillation of the arm 64 by reason of the fact that the cam roller 70 upon said arm 64 rides in the circumferential cam slot 87 of the cam wheel. Each complete back and forth oscillation of the arm 64 in turn imparts a complete back and forth oscillation to the drum 40, and the back and forth oscillations of the drum act upon the cable (or cables) 41, in a manner which is obvious, to alternately wind the branches 43 and 44 of the cable upon the drum and unwind said branches from said drum to thus accomplish complete back and forth reciprocations of the carriage 17 causing the work table and the work 131 thereon to move back and forth transversely of the grinding wheel.

During the reciprocatory movements of the carriage 17 with the work, a circular part of the cam 96 rides under the roller 98 upon the push rod 97, so that the lead screw 74 and the carriage 19 remain stationary while the cut is accomplished. At the end of each back and forth reciprocation as mentioned, a high part of the cam 96 rides up against the roller 98 and elevates the push rod 97 against the action of the coil spring 100. This action in turn causes the oblique or cam face 99 of the push rod to forcibly shove the roller 115 upon the actuating lever 113 to one side and thus rotate the actuating lever 113 a corresponding amount against the action of the coil spring 116. Rotation of the actuating lever causes the pawl 114 to advance the ratchet 110 and, through the instrumentality of the intermediate train of gears, the ratchet turns the internal gear 79 and with it the lead screw 74. The turning movement of the lead screw advances the tip 75 thereof and the carriage 19 toward the grinding wheel, against the action of the weight 25, and as the lead screw advances, the internal gear 79 slides along the small gear 107. The high part of the cam 96 rides from under the roller 98 of the push rod, the coil spring 100 depresses the roller, and the circular part of the cam 96 rides under the said roller 98 during the succeeding back and forth reciprocation of the carriage 17, in the manner as before described. The coil spring 116 returns the actuating lever 113 to its initial position, ready for another advancing operation upon the ratchet, when the push rod 97 is depressed by the coil spring 100 to allow the roller 115 of said actuating lever 113 to recede and the arm 120 thereof to move toward and preferably engage the stop 119. During the return movement of the actuating lever, the pawl rides freely over the teeth of the ratchet.

It will be seen that the arrangement as fully described provides for successive back and forth reciprocations of the work transversely of the grinding wheel, and for a controlled feeding movement of the work longitudinally of the grinding wheel between each of the said successive back and forth transverse reciprocations. It will also be seen that the drum and cable construction for accomplishing the transverse reciprocations of the work will preclude the transmission of vibration to the work through the driving or manipulating mechanism feeding the work past the grinding wheel.

What is desired to be protected by Letters Patent is:

1. In a precision grinder, a grinding element, means for rotating said grinding element, a work holder, means for feeding said work holder longitudinally of the grinding element, and means for reciprocating said work holder transversely of said grinding element, said last mentioned means comprising a cable secured to said work holder, rollers supporting said cable, and devices for moving said cable to and fro on said rollers.

2. In a precision grinder, a grinding element, means for rotating said grinding element, a work holder, means for feeding said work holder longitudinally of the grinding element, and means for reciprocating said work holder transversely of said grinding element, said last mentioned means comprising a drum, mechanism for oscillating said drum, a cable secured to said drum to alternately wind thereon and unwind therefrom as the drum is oscillated, and devices securing said cable to said work holder.

3. In a precision grinder, a grinding element, means for rotating said grinding element, a work holder, means for feeding said work holder longitudinally of the grinding element, and means for reciprocating said work holder transversely of said grinding element, said last mentioned means comprising a drum, mechanism for oscillating said drum, cable branches secured to said drum to alternately wind thereon and unwind therefrom as the drum is oscillated, a pair of rollers between and over which said cable branches pass, a second pair of rollers around and over which said cable branches pass, and devices securing said cable branches to said work holder.

4. In a precision grinder, a grinding element, means for rotating said grinding element, a work holder, means for feeding said work holder longitudinally of the grinding element, and means for reciprocating said work holder transversely of said grinding element, said last mentioned means comprising a drum, a raceway upon which said drum is mounted, mechanism for oscillating said drum upon said raceway, cable branches secured to said drum to alternately wind thereon and unwind therefrom as the drum is oscillated, and devices securing said cable branches to said work holder.

5. In a precision grinder, a grinding element, means for rotating said grinding element, a work holder, means for feeding said work holder longitudinally of the grinding element, and means for reciprocating said work holder transversely of said grinding element, said last mentioned means comprising a drum, a pivoted arm associated with said drum to oscillate the same, a member having a circumferential cam slot, mechanism for rotating said member, a cam roller upon said pivoted arm and ridable in said cam slot to oscillate said arm, cable branches secured to said drum to alternately wind thereon and unwind therefrom as the drum is oscillated, and devices securing said cable branches to said work holder.

6. In a precision grinder, a grinding element, means for rotating said grinding element, a transversely movable carriage including a work holder, means for feeding said carriage and work holder longitudinally of the grinding element, and means for reciprocating said carriage and work holder transversely of said grinding element, said last mentioned means comprising a drum, mechanism for oscillating said drum, cable branches secured to said drum to alternately wind thereon and unwind therefrom as the drum is oscillated, a cage secured to said transversely movable carriage, and devices adjustably securing each of said cable branches to said cage.

7. In a precision grinder, a grinding element, means for rotating said grinding element, a transversely movable carriage including a work holder, means for feeding said carriage and work holder longitudinally of the grinding element, and means for reciprocating said carriage and work holder transversely of said grinding element, said last mentioned means comprising a drum, mechanism for oscillating said drum, cable branches secured to said drum to alternately wind thereon and unwind therefrom as the drum is oscillated, a cage, a rod in said cage and in said transversely movable carriage to secure said cage to said carriage, and devices securing said cable branches to said cage.

8. In a precision grinder, a frame, a grinding element thereon, means for rotating said grinding element, a transversely movable carriage including side walls resting upon and slidable along said frame and a work holder above said side walls, means for feeding said carriage and work holder longitudinally of the grinding element, and means for reciprocating said carriage and work holder transversely of said grinding element, said last mentioned means comprising a drum, mechanism for oscillating said drum, cable branches secured to said drum to alternately wind thereon and unwind therefrom as the drum is oscillated, rollers over which said cable branches pass, a cage at the side of said transversely movable carriage opposite said work holder, a rod in said cage and in the side walls of said transversely movable carriage to secure said cage to said carriage, shanks upon said cage at the opposite sides of said rod and about which said cable branches pass, clamps upon the end portions of said cable branches spaced from said drum, and adjusting screws in said cage and entering threaded openings in said clamps to secure said cable branches to said cage, each adjusting screw being turnable in said cage to move its clamp along the thread of said adjusting screw, to thus separately adjust the length of each of said cable branches.

9. In a precision grinder, the combination of a grinding element, means for rotating said grinding element, a work holder, and means for imparting successive back and forth reciprocations to said work holder transversely of said grinding element, said last mentioned means consisting of a drum, mechanism for oscillating said drum, cable branches secured to said drum to alternately wind thereon and unwind therefrom as the drum is oscillated, and devices securing said cable branches to said work holder, with means for feeding the work holder longitudinally of the grinding element between each of the said successive back and forth reciprocations of said work holder.

10. In a precision grinder, the combination of a grinding element, means for rotating said grinding element, a work holder, and means for imparting successive back and forth reciprocations to said work holder transversely of said grinding element, said last mentioned means consisting of a drum, mechanism for oscillating said drum, cable branches secured to said drum to alternately wind thereon and unwind therefrom as the drum is oscillated, and devices securing said cable branches to said work holder, with means actuated by said drum oscillating mechanism for controllably feeding the work holder longitudinally of the grinding element between each of the said successive back and forth reciprocations of said work holder.

11. In a precision grinder, the combination of a grinding element, means for rotating said grinding element, a work holder, and means for imparting successive back and forth reciprocations to said work holder transversely of said grinding element, said last mentioned means consisting of a drum, a pivoted arm associated with said drum to oscillate the same, a member having a circumferential cam slot, mechanism for rotating said member, a cam roller upon said pivoted arm and ridable in said cam slot to oscillate said arm, cable branches secured to said drum to alternately wind thereon and unwind therefrom as the drum is oscillated, and devices securing said cable branches to said work holder, with means actuated by the mechanism rotating said member for controllably feeding the work holder longitudinally of the grinding element between each of the said successive back and forth reciprocations of said work holder.

12. In a precision grinder, the combination of a grinding element, means for rotating said grinding element, a work holder, and means including a cable secured to said work holder for reciprocating the same transversely of said grinding element, with mechanism urging said work holder longitudinally away from said grinding element, and means for controllably advancing said work holder toward said grinding element, against the action of said mechanism, between each of the said successive back and forth reciprocations of said work holder.

13. In a precision grinder, the combination of a grinding element, means for rotating said grinding element, a work holder, and means including a cable secured to said work holder for reciprocating the same transversely of said grinding element, with mechanism urging said work holder longitudinally away from said grinding element, and means for controllably advancing said work holder toward said grinding element, against the action of said mechanism, between each of the said successive back and forth reciprocations of said work holder, said last mentioned means consisting of a lead screw checking the movement of said mechanism to limit the extent to which said work holder can move away from said grinding element, and a device for controllably rotating said lead screw.

14. In a precision grinder, the combination of a grinding element, means for rotating said grinding element, a work holder, and means including a cable secured to said work holder for reciprocating the same transversely of said grinding element, with a weight suspended from said work holder to move it longitudinally away from said grinding element, and means for controllably advancing said work holder toward said grinding element, against the action of said weight, between each of the said successive back and forth reciprocations of said work holder, said last mentioned means consisting of a lead screw checking the movement of said weight to limit the extent to which said work holder can move away from said grinding element, and a device for controllably rotating said lead screw.

15. In a precision grinder, the combination of a grinding element, means for rotating said grinding element, a work holder, and means for imparting successive back and forth reciprocations to said work holder transversely of said grinding element, said last mentioned means consisting of a drum, a pivoted arm associated with said drum to oscillate the same, a member having a circumferential cam slot, a shaft upon which said member is fixed, mechanism for rotating said shaft, a cam roller upon said pivoted arm and ridable in said cam slot to oscillate said arm, cable branches secured to said drum to alternately wind thereon and unwind therefrom as the drum is oscillated, and devices securing said cable branches to said work holder, with means for controllably advancing said work holder toward said grinding element between each of the said successive back and forth reciprocations of said work holder, said means for controllably advancing said work holder consisting of a lead screw, a cam upon said shaft, and an operative driving connection between said cam and said lead screw.

16. In a precision grinder, the combination of a grinding element, means for rotating said grinding element, a work holder, and means for imparting successive back and forth reciprocations to said work holder transversely of said grinding element, said last mentioned means consisting of a drum, a pivoted arm associated with said drum to oscillate the same, a member having a circumferential cam slot, a shaft upon which said member is fixed, mechanism for rotating said shaft, a cam roller upon said pivoted arm and ridable in said cam slot to oscillate said arm, cable branches secured to said drum to alternately wind thereon and unwind therefrom as the drum is oscillated, and devices securing said cable branches to said work holder, with mechanism urging said work holder longitudinally away from said grinding element, and means for controllably advancing said work holder toward said grinding element, against the action of said last mentioned mechanism, between each of the said successive back and forth reciprocation of said work holder, said means for controllably advancing said work holder consisting of a lead screw checking the movement of said mechanism to limit the extent to which the work holder can move away from said grinding element, a cam upon said shaft, and an operative driving connection between said cam and said lead screw.

17. The combination as specified in claim 15, wherein the said operative driving connection comprises an internal gear about and secured to said lead screw, a push rod engaged by said cam, a pivotally mounted actuating lever adapted to be engaged and operated by said push rod, a pawl upon said actuating lever, a ratchet engaged by said pawl, and a gear connection between said ratchet and internal gear.

18. The combination as specified in claim 15, wherein the said operative driving connection comprises an internal gear about and secured to said lead screw, a push rod engaged by said cam, a slidably mounted cage, a pivotally mounted actuating lever upon said cage and adapted to be engaged and operated by said push rod, a pawl upon said actuating lever, a ratchet adapted to be engaged by said pawl when said actuating lever is engaged by said push rod, and a gear connection between said ratchet and internal gear.

In testimony whereof, I have signed my name at Milwaukee, Wisconsin, this 23rd day of August, 1929.

FRED H. WHITMAN.